Dec. 28, 1965   W. REMUND   3,225,632
MACHINE FOR HANDLING CONTINUOUSLY EXTRUDED PLASTIC MATERIAL
Filed Aug. 5, 1963   2 Sheets-Sheet 1

INVENTOR
WERNER REMUND
BY
*Mc Glew + Toren*
ATTORNEYS

Dec. 28, 1965   W. REMUND   3,225,632
MACHINE FOR HANDLING CONTINUOUSLY EXTRUDED PLASTIC MATERIAL
Filed Aug. 5, 1963   2 Sheets-Sheet 2

INVENTOR
WERNER REMUND
BY
*McGlew & Toren*
ATTORNEYS

с

United States Patent Office 3,225,632
Patented Dec. 28, 1965

3,225,632
MACHINE FOR HANDLING CONTINUOUSLY EXTRUDED PLASTIC MATERIAL
Werner Remund, Uzwil, Switzerland, assignor to Gebruder Buhler, Uzwil, Switzerland, a company of Switzerland
Filed Aug. 5, 1963, Ser. No. 299,966
Claims priority, application Switzerland, Aug. 10, 1962, 9,612/62
9 Claims. (Cl. 83—83)

This invention relates to a machine for automatically handling continuously extruded plastic material and more particularly applies to a machine for automatically suspending stranded alimentary paste products such as spaghetti, macaroni, noodles and the like onto suspension rods and subsequently trimming the depending strands to equal length.

In hitherto known devices for trimming extruded plastic goods, especially stranded alimentary paste products such as spaghetti, macaroni and the like the strands are brought to suitably disposed cutters. The trimmings are usually removed by some suitable discharge means, e.g. a belt conveyor transversely disposed within and below the trim-cutting system. Experience has now shown that occasionally depending strands may be caught at their ends by the conveyor belt before reaching the cutters and miss them.

The main objects of this invention therefore consists in eliminating the disadvantages mentioned by providing a new and novel means and method for trimming stranded alimentary paste products such as spaghetti, macaroni and the like with a view to promote simplification of their manufacture and reduction of waste.

The machine of this invention includes in combination a first conveyor carrying suspension rods, means for automatically suspending extruded strands of plastic material onto said suspension rods, cutting means disposed in the zone of the ends of said depending strands for uniform trimming said depending strands. A particular feature of this machine consists in a second conveyer disposed in a parallel position in respect of the first conveyor within the zone of the ends of the depending strands to form a supporting surface thereof and extending beyond the trimming means.

These and other objects and advantages as well as further characteristic features of this invention will become apparent from the following detailed description and the appended claims with reference to the accompanying drawing, showing in—

Figure 1:
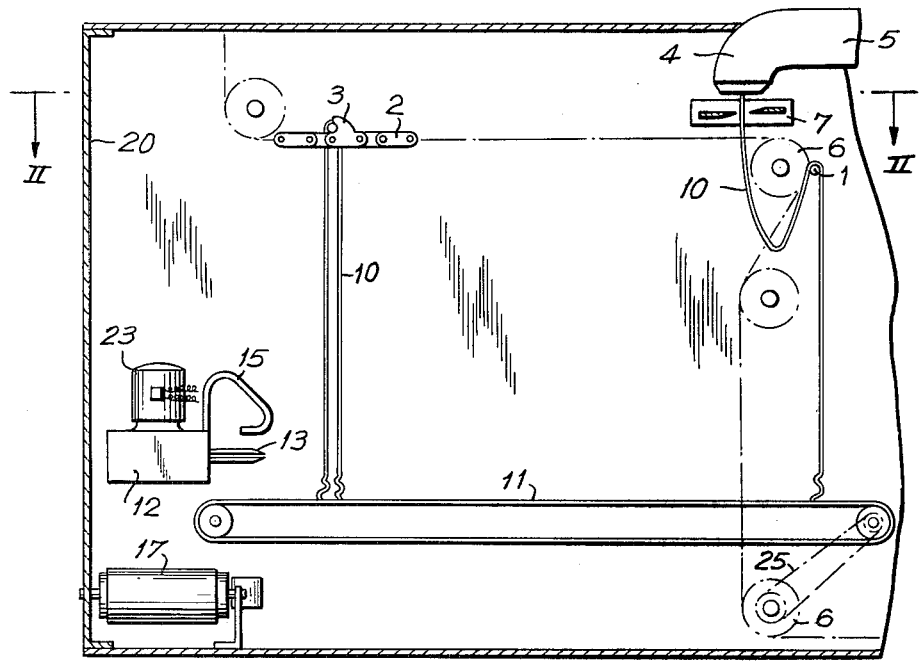
Figure 2:
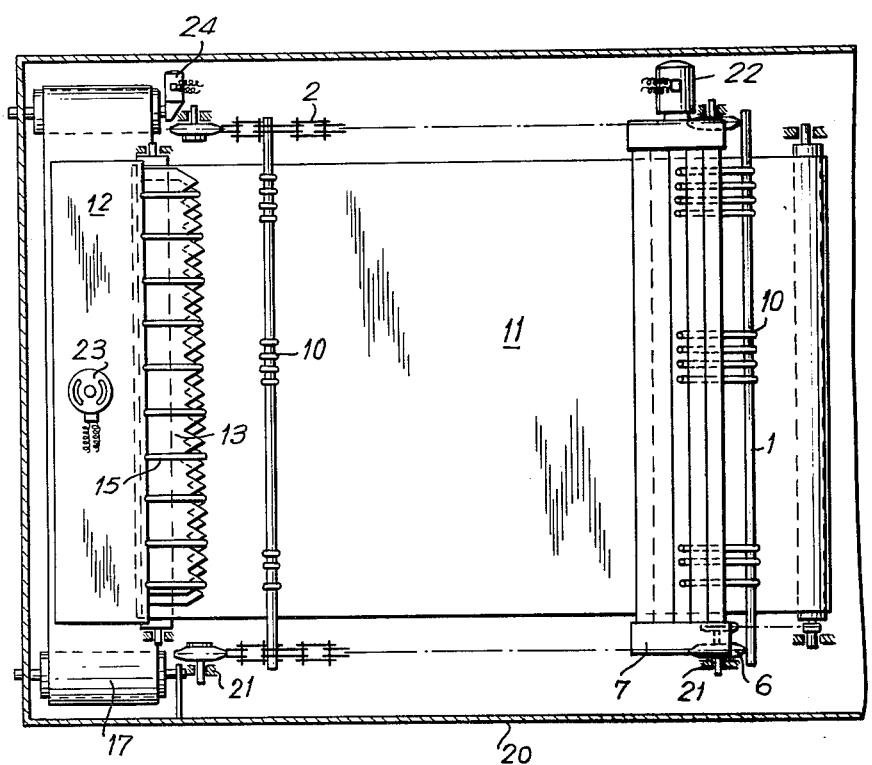

FIG. 1 a longitudinal section of a handling unit for automatically suspending and trimming depending strands in a diagrammatic representation, and in FIG. 2 a plan view of the handling unit of FIG. 1.

In the machine represented in FIGURES 1 and 2 suspension rods 1 disposed on a chain conveyer 2 having engaging cams 3 arranged thereon pass below the expresser head 4 of an alimentary paste extruder press 5. The chain conveyer 2 runs over guide rollers 6. Between the expresser head 4 and the chain conveyer 2 cutting means 7 are disposed for operation at regular intervals to cut predetermined portions off the extruded strands 10.

Below the expresser head and the horizontal portion of the chain conveyer 2 in the zone of the depending strands an endless belt conveyor 11 is disposed parallel to the chain conveyer 2 and extending horizontally from below the horizontal portion of this latter to below and slightly beyond a second unit of cutting means 12 comprising a pair of trimming knives each having a row of cooperating cutting edges 13. Guide brackets 15 collect the arriving depending strands 10 in bunches and bring them within the cutting zone of the trimming knives 13 to cut them to uniform length. Below the discharge end of the conveyor belt 11 a further belt conveyor 17 disposed for moving in a transverse direction along the discharge end of conveyor 11 to remove the trimmings dropping from the discharge end of this latter. This equipment is surrounded by a casing 20. The guide rollers 6 are supported by bearings 21. The cutting unit 7 and the trimming unit 12 are actuated by motors 22 and 23 respectively. The belt conveyor 11 may be driven by means of a chain 25 or the like from chain conveyer 2. A separate motor 24 may be provided as shown to drive the belt conveyor 17 removing the trimmings.

The arrangement described hereinbefore works as follows:

The suspension rods 1 carried by the chain conveyer 2 successively pass below and across a row of extrusion nozzles disposed in the expresser head 4 in such a way that the extruded strands 10 of alimentary paste are automatically hung and spread over the whole length of each individual rod 1 in succession. As soon as each suspension rod 1 approaches the cutting unit 7 predetermined lengths of the strands spread over the suspension rod are simultaneously cut off from the freshly extruded strand portions. During the subsequent horizontal forward movement of the suspension rods 1 the lower ends of the depending strands 10 abut against conveyer belt 11 which moves at exactly the same speed as the chain conveyer 2, and forms a supporting surface for the strands 10 with the result that their vertical position is maintained very accurately. Since moreover the depending strands 10 immediately before reaching the cutting zone of the trimming knives 13 are grouped into small bunches by means of the guide brackets 15 trimming of the strands to uniform length in turn occurs with utmost accuracy. The trimmings are then forwarded to the conveyer belt 17 and may be retransmitted into the mixer again for re-use. On the other hand the strands then proceeding through the subsequent drying process are characterized by a very uniform size and quality, while, in the final cutting stage when the inverted U-shaped loops are cut off, wastes are reduced to the utmost minimum.

It is of course understood that any other suitable conveyor means, including the scale-type belts frequently used in the macaroni industries for short goods, may also be used instead of either of the conveyor belts 11 and/or 17. Also instead of the discharge conveyor 17 any suitable kind of a chute may be used without departing from the spirit of this invention.

I claim:

1. A machine for handling extruded plastic material particularly alimentary paste material such as spaghetti, comprising means for extruding a continuous strand of plastic material, a first conveyor adjacent said extruding means carrying at least one suspension rod movable through a path on said conveyor to engage a strand being extruded intermediate the length of the strand and to support the engaged strand with its ends hanging downwardly from said rod and being movable with said conveyor to conduct the strand away from said extrusion means, cutting means for cutting each strand as it is fed from said extrusion means and after engagement by said suspension rod, a second conveyor disposed in alignment with said first conveyor at a location to carry and support the lower ends of each strand supported by said suspension rod and being movable in the same direction and rate of speed as said first conveyor, and trimming means disposed between said first and second conveyors in a position to intercept the strands carried by said suspension rod and said second conveyor and to cut each end of said strand to a uniform predetermined length as it is moved by said first and second conveyors.

2. A machine for handling extruded plastic material particularly alimentary paste material such as spaghetti, comprising means for extruding a continuous strand of plastic material, a first conveyor adjacent said extruding means carrying at least one suspension rod movable through a path on said conveyor to engage a strand being extruded intermediate the length of the strand and to support the engaged strand with its ends hanging downwardly from said rod and being movable with said conveyor to conduct the strand away from said extrusion means, cutting means for cutting each strand as it is fed from said extrusion means and after engagement by said suspension rod, a second conveyor disposed in alignment with said first conveyor at a location to carry and support the lower ends of each strand supported by said suspension rod and being movable in the same direction as said first conveyor, and trimming means disposed between said first and second conveyors in a position to intercept the strands carried by said suspension rod and said second conveyor and to cut each end of said strand to a uniform predetermined length, said trimming means comprising a laterally elongated cutter disposed across said second conveyor at a predetermined distance thereabove to effectively cut each end of said strand to an accurate predetermined length as each strand is moved by said first and second conveyors.

3. A machine for handling extruded plastic material particularly alimentary paste material such as spaghetti, comprising means for extruding a continuous strand of plastic material, a first conveyor adjacent said extruding means carrying at least one suspension rod movable through a path on said conveyor to engage a strand being extruded intermediate the length of the strand and to support the engaged strand with its ends hanging downwardly from said rod and being movable with said conveyor to conduct the strand away from said extrusion means, cutting means for cutting each strand as it is fed from extrusion means and after engagement by said suspension rod, a second conveyor disposed in alignment with said first conveyor at a location to carry and support the lower ends of each strand supported by said suspension rod and being movable in the same direction as said first conveyor, trimming means disposed between said first and second conveyors in a position to intercept the strands carried by said suspension rod and to cut each end of said strand to a uniform predetermined length, said trimming means comprising a laterally elongated cutter disposed across said second conveyor at a predetermined distance thereabove to effectively cut each end of said strands to an accurate predetermined length, and means for grouping said strands as they are engaged by said trimming means.

4. A machine for handling extruded plastic material particularly alimentary paste material such as spaghetti, comprising means for extruding a continuous strand of plastic material, a first conveyor adjacent said extruding means carrying at least one suspension rod movable through a path on said conveyor to engage a strand being extruded intermediate the length of the strand and to support the engaged strand with its ends hanging downwardly from said rod and being movable with said conveyor to conduct the strand away from said extrusion means, cutting means for cutting each strand as it is fed from extrusion means and after engagement by said suspension rod, a second conveyor disposed in alignment with said first conveyor at a location to carry and support the lower ends of each strand supported by said suspension rod and being movable in the same direction as said first conveyor, trimming means disposed between said first and second conveyors in a position to intercept the strands carried by said suspension rod and to cut each end of said strand to a uniform predetermined length, and a third conveyor disposed adjacent the discharge end of said second conveyor in a position to receive the cut ends of said strands which are delivered by said second conveyor.

5. A machine for the automatic handling of continuously extruded plastic material, in particular stranded alimentary paste products such as spaghetti, maccaroni and the like, including in combination, a first conveyor carrying suspension rods, means adjacent said first conveyor suspending extruded strands of plastic material onto said suspension rods, cutting means for uniformly trimming said depending strands disposed along the path of movement of said strands on said first conveyor in the zone of the ends of the strands depending from said suspension rods, and a second conveyor disposed in a parallel position in respect to said first conveyor within the zone of the ends of said depending strands and extending beyond said trimming means and forming a supporting surface for the ends of the strands as they are moved by said first conveyor.

6. A machine for the automatic handling of continuously extruded plastic material, in particular stranded alimentary paste products such as spaghetti, maccaroni and the like, including in combination, a first conveyor carrying suspension rods, means adjacent said first conveyor suspending extruded strands of plastic material onto said suspension rods, cutting means for uniformly trimming said depending strands disposed along the path of movement of said strands on said first conveyor in the zone of the ends of the strands depending from said suspension rods, and a second conveyor disposed in a parallel position in respect to said first conveyor within the zone of the ends of said depending strands extending beyond said trimming means and forming a supporting surface for the ends of the strands as they are moved by said first conveyor; said second conveyor comprising a belt conveyor moving synchronously with said first conveyor.

7. A machine for the automatic handling of continuously extruded plastic material, in particular stranded alimentary paste products such as spaghetti, maccaroni and the like, including in combination, a first conveyor carrying suspension rods, means adjacent said first conveyor suspending extruded strands of plastic material onto said suspension rods, cutting means for uniformly trimrming said depending strands disposed along the path of movement of said strands on said first conveyor in the zone of the ends of the strands depending from said suspension rods, and a second conveyor disposed in a parallel position in respect to said first conveyor within the zone of the ends of said depending strands extending beyond said trimming means and forming a supporting surface for the ends of the strands as they are moved by said first conveyor, said second conveyor being a movable belt conveyor.

8. A machine for automatic handling of continuously extruded plastic material, in particular stranded alimentary paste products such as spaghetti, maccaroni and the like, including in combination, a first conveyor carrying suspension rods, means adjacent said first conveyor suspending extruded strands of plastic material onto said suspension rods, cutting means for uniformly trimming said depending strands disposed along the path of movement of said strands on said first conveyor in the zone of the ends of the strands depending from said suspension rods, and a second conveyor disposed in a parallel position in respect to said first conveyor within the zone of the ends of said depending strands extending beyond said trimming means and forming a supporting surface for the ends of the strands as they are moved by said first conveyor, and a discharge conveyor disposed below the discharge end of said second conveyor in alignment with the discharge end thereof to remove the trimmings cut off by said trimming means.

9. A machine as claimed in claim 8, wherein said discharge conveyor comprises a belt conveyor movable in transverse direction along the discharge end of said second conveyor.

References Cited by the Examiner
UNITED STATES PATENTS

| | | |
|---|---|---|
| 2,223,352 | 12/1940 | Francisci. |
| 2,694,986 | 11/1954 | Braibanti et al. |
| 3,066,562 | 12/1962 | Barnett et al. |

WILLIAM W. DYER, JR., *Primary Examiner.*

WILLIAM S. LAWSON, *Examiner.*